Feb. 7, 1950        C. P. HEINTZE        2,496,624
CONSTANT SPEED DRIVE FOR HELICOPTER ROTORS
Filed Aug. 27, 1945
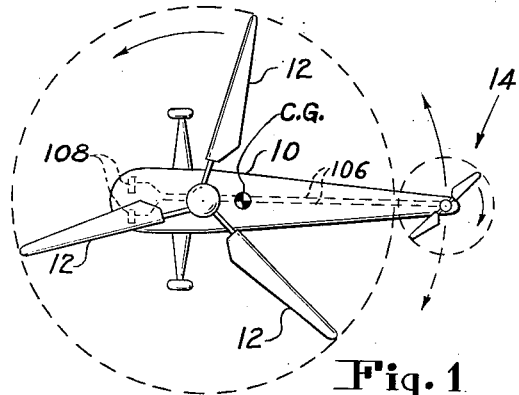
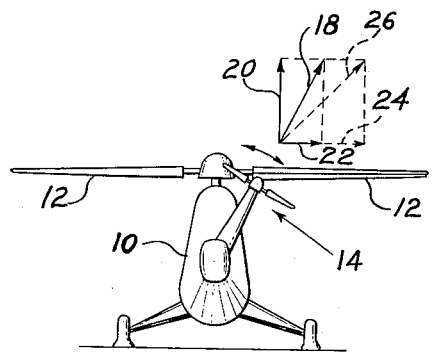
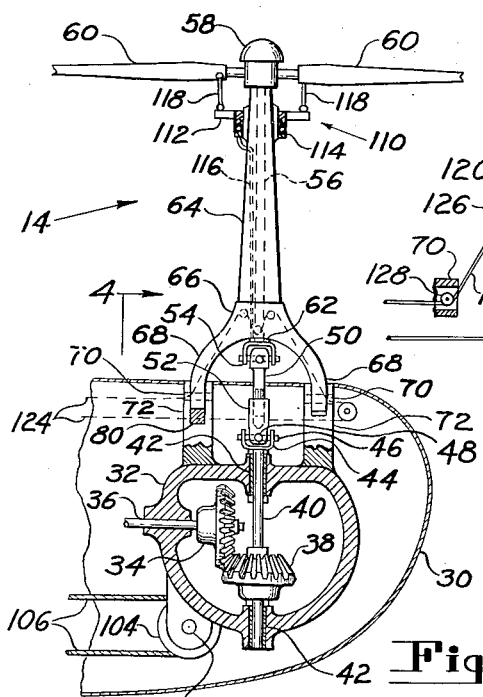
CARL PAUL HEINTZE
INVENTOR
BY *Gifford S. Holmes*
AGENT Patented Feb. 7, 1950

2,496,624

UNITED STATES PATENT OFFICE 2,496,624

CONSTANT SPEED DRIVE FOR HELICOPTER ROTORS

Carl Paul Heintze, Amityville, N. Y., assignor to United Aircraft Corporation, East Hartford, Conn., a corporation of Delaware Application August 27, 1945, Serial No. 612,899

1 Claim. (Cl. 170—135.22)

This invention relates to means for obtaining constant velocity rotary motion in tiltable members, and more particularly to tilt mechanism for rotors for aircraft.

In aircraft of the type commonly known as helicopters, it is desirable to have rotors that may be tilted with respect to the body thereof to obtain thrust at different angles for maneuvering and also for counteracting torque of one rotor by the tilt of another rotor. This invention employs constant velocity joint means for use in such rotor and the rotor itself and controls therefor are similar in some respect to that shown in the co-pending application of Igor I. Sikorsky, Serial No. 698,947, filed September 24, 1946.

An object of this invention is to provide a tiltable rotatable shaft with mounting means for obtaining a constant velocity in the shaft even when it is tilted with respect to a drive shaft therefor.

Another object is to provide an improved helicopter torque compensation rotor with constant speed tiltable means.

A further object is to provide an improved constant speed tiltable and rotatable shaft.

Other objects will be either obvious or pointed out in the following specification and claims and pertain to the details of construction and the arrangement of parts of the improved tiltable shaft means illustrated in the drawing in a preferred embodiment, in which Fig. 1 is a plan view of a helicopter including my invention;

Fig. 2 is a view looking from the rear at the helicopter and including a vector diagram of forces exerted by the torque compensating rotor;

Fig. 3 is a view partially in section and partially in elevation looking from the side at the aft end portion of the helicopter;

Fig. 4 is a section taken along the lines 4—4 of Fig. 3 with parts in elevation;

Fig. 5 is a diagrammatic view of the total pitch control linkage to the torque compensating rotor; and Fig. 6 is a diagram of the tilt linkage including a pair of universal joints and a slip joint jackshaft.

In Fig. 1, a helicopter 10 is provided with a main sustaining rotor having blades 12 which turn in the direction indicated, and exert a torque tending to turn the body 10 of the helicopter in the opposite direction. A torque compensating rotor 14 is arranged in a tilted plane with respect to the plane of rotation of the blades 12 and exerts a lateral component of force opposing such torque. The rotor 14 also turns in a direction opposite to the main rotor.

In Fig. 2, the torque compensating rotor 14 is shown as inclined upwardly and toward the right to exert a force in the direction indicated by the line 18 of a vector diagram above the helicopter. The thrust line 18 will have a vertical component 20 which adds to the lift of the blades 12 for sustaining the helicopter body 10, and a lateral component 22 for counteracting the torque of the main rotor. As more torque compensation is required, the torque compensating rotor 14 can be tilted more toward the right as viewed in Fig. 2 to exert a greater lateral component indicated by the broken line 24 to offset the greater torque requirement. At this time, to maintain a constant lift as indicated by the vector 20, the thrust will have to be increased as represented by the thrust line 26. This is accomplished by increasing the pitch of the blades. As less torque is required, the direction of the torque compensating rotor 14 can be more upwardly and the pitch of the blades thereof reduced to maintain substantially the same vertical component of lift 20. As more or less lift is required in the torque compensating rotor 14 to control pitching of the body 10 of the helicopter, the torque compensating rotor 14 can be rotated more nearly to the vertical pitch and the torque increased or reduced as the case requires to maintain substantially a constant lateral component of thrust indicated by the lines 22 and 24 to maintain a given heading for the helicopter.

As best shown in Figs. 3 and 4, the torque compensation rotor mechanism 14 is mounted within a tail cone 30 of the body 10 of the helicopter. A gear housing 32 contains a bevel gear 34 turned by a shaft 36 from an engine, not shown. The bevel gear 34 turns a second bevel gear 38 to rotate a shaft 40 carried in bearings 42 in the housing 32. The shaft 40 turns one yoke of a universal joint 44 of the conventional type containing a central spider having pivots 46 and 48 about which a jackshaft 50 containing a slip joint 52 can turn at an angle to the axis of the shaft 40. The jackshaft 50 turns a similar universal joint 54 which connects with a shaft 56 turning a head 58 that pivotally mounts rotor blades 60 of the torque compensating rotor 14. The shaft 56 is carried in a bearing 62 at its lower end adjacent the universal joint 54, and is suitably journaled at its upper end within a torque tube 64.

The torque tube 64 is mounted in a yoke 66 having legs 68 pivoted upon pins 70 in upstanding ears 72 on the housing 32. The pins 70 lie in a plane containing the axis of the shaft 40 and are located midway between the centers of rotation of the universals 44 and 54 when the axis of the shaft 56 also lies in this plane. The torque tube 64 is tiltable by control mechanism including an arm 80 formed as an extension of one leg 68 of the yoke 66 so that the torque tube 64 will rotate about the axis of the pins 70. The arm 80 is provided with a pivot 82 at its outermost end into which a link 84 pivots at its upper end. The link 84 is connected by a pivot 86 to one arm of a bell crank 88 mounted upon a pivot 90 is a pair of ears 92 formed at the sides of the housing 32. The other arm of the bell crank 88 is provided with a pivot 94 which rides in a slot 96 and connects with a screw 98 moved by a jack 100 carried between ears 102 formed as lower extensions of the housing 32. The jack 100 is turned by a sheave 104 by cables 106 that are wrapped therearound and extend forwardly to the cockpit of the body 10, Fig. 1, and are movable by foot pedals 108 by the pilot. When the cables 106 are moved, the sheave 104 will rotate and turn the jack 100 to screw the shaft 98 in or out and rock the bell crank 88 and thus move the link 84 to rotate the arm 80 and tilt the torque tube 64. By such arrangement, the direction of thrust of torque compensating rotor mechanism 14 will be changed.

The total pitch of blades 60 is controlled by rocking the blades 60 around their longitudinal axes simultaneously through control mechanism 110 which comprises a collar 112 secured by ball bearings to a second collar 114 that is movable up and down by a rod 116 to thereby move the collar 112 up and down. Compression tension rods 118 will be moved with the collar 112 to rotate the blades 60 around their longitudinal axes to change their angles of incidence and thus change the power absorbed thereby and the total thrust of the torque compensating mechanism 14. The rod 116 is mounted in bearings 120 at its lower end within the torque tube 64. As best shown in Fig. 5, the rod 116 is provided with a clip 122 to which ends of cables 124 are attached. The cables 124 lead over pulleys 126 that are rotatably mounted within the yoke 66 and lead out to pulleys 128 through the pins 70 which are hollow and mount the pivot pins of the pulleys 128. The cables 124 may connect with the cables 106 and be controlled simultaneously therewith under the influence of the pilot, or may be separately connected with the joy stick, not shown, or to other suitable control means in the cockpit. Such other control means are shown in the aforementioned co-pending application of Igor I. Sikorsky, Appl. Ser. No. 698,947.

It is readily apparent that the tilt of the rotor 14 and the pitch of the blades 60 may be varied to trim the helicopter with respect to its longitudinal axis to compensate for changes in the position of the center of gravity, C. G., in addition to counteracting the torque of the main rotor.

In Fig. 6, the arrangement of the universal joints and the pivot for the torque tube 64 is illustrated. The universal 44 and the universal 54 are spaced from the axis through pivot pins 70 at distances represented by dimensions A and B. As the yoke 66 is rotated about the pivot pins 70 from the position shown in solid lines to the position shown in broken lines, the dimensions A and B will be of exactly the same length, though the distance between the universal joints 44 and 54 will vary for the entire movement. The slip joint 52 in the jackshaft 50 is provided so the jackshaft 50 may lengthen and shorten. The velocity of the shaft 40 will cause the jackshaft 50 when in an angled position with relation to the shaft 40, to have accelerations and decelerations of a magnitude determined by the angle 150 subtended between the axis of the shaft 40 and the axis of the jackshaft 50. Thus, for a constant velocity of shaft 40, the jackshaft 50 will accelerate and decelerate twice in each revolution. The angle 160 between the shaft 56 and the jackshaft 50 will be equal to the angle 150. Hence, the different angular velocity between the jackshaft 50 and the shaft 56 will be opposite and in the same proportion as the velocity differences between the jackshaft 50 and the shaft 40. However, because the cooperating pivots of the universals in the jackshaft lie in a common plane, so long as the angles 150 and 160 are equal to each other, the irregular velocity of the jackshaft 50 will not carry through to the shaft 56 but will be cancelled out. Thus, for a constant velocity in the shaft 40, the shaft 56 will rotate at the same velocity.

While I have shown and described one preferred embodiment and use for this invention, it will be clear that many other uses will occur to those skilled in the different arts. For example, it would be obvious to use a connection similar to this in conjunction with the universal couplings in other type vehicles than helicopters. It would also be obvious to use such constant velocity mechanism in conjunction with machines in which such function is desirable, and to obtain a constant velocity in any direction by making the pivots 70 part of a universal joint having a center of rotation coincident with the point of intersection of the axes of the input and output shafts, or by use of other constant velocity universal joints. For these reasons, I wish not to be limited in my invention only to that particular form shown and described but by the spirit and the scope of the subjoined claim.

I claim:

In a helicopter, an elongated body, a main sustaining rotor rotatable about a generally upright axis at the fore part of said body, a tail cone pivoted about a fore and aft axis in said body having an auxiliary sustaining rotor mounted thereon, said auxiliary rotor when tilted by movement of said cone about said axis exerting a lateral thrust on said body, an upright power driven shaft in said body beneath said cone, a rotor shaft carried by said cone, and means for providing a constant speed relationship between said power driven shaft and said auxiliary rotor during tilting of said cone including a jack shaft located between said power driven shaft and said rotor shaft having telescoping extensible elements, a universal joint connecting one element of said jack shaft with said power driven shaft, and a second universal joint connecting the other element of said jack shaft with said rotor shaft, said universal joints being located equal distances from said fore and aft axis about which said cone pivots.

CARL PAUL HEINTZE.

REFERENCES CITED

The following references are of record in the file of this patent:

UNITED STATES PATENTS

| Number | Name | Date |
|---|---|---|
| 1,409,850 | Haney | Mar. 14, 1922 |
| 2,072,090 | Anderson | Mar. 2, 1937 |
| 2,130,918 | DeStefano | Sept. 20, 1938 |
| 2,135,073 | Gerhardt et al. | Nov. 1, 1938 |
| 2,139,963 | Leason | Dec. 13, 1938 |
| 2,273,303 | Waldron | Feb. 17, 1942 |
| 2,385,889 | Skavinsky | Oct. 2, 1945 |

FOREIGN PATENTS

| Number | Country | Date |
|---|---|---|
| 292,018 | Italy | Dec. 31, 1931 |
| 688,103 | France | 1930 |